United States Patent [19]

Busby et al.

[11] 3,820,929
[45] June 28, 1974

[54] ELECTROSTATIC PINNING OF POLYMERIC FILM

[75] Inventors: Joseph B. Busby, Central; Robert K. Dotson, Greenville, both of S.C.

[73] Assignee: Celanese Corporation, New York, N.Y.

[22] Filed: Dec. 14, 1972

[21] Appl. No.: 315,271

[52] U.S. Cl. ........ 425/174.8 E, 264/24, 317/262 E, 425/377, 425/446, 425/455
[51] Int. Cl. ............................................. B29d 7/22
[58] Field of Search ................... 264/22, 24, 85, 66; 317/262 E; 425/162, 174.8, 445, 446, 377, 455

[56] References Cited
UNITED STATES PATENTS

| | | | |
|---|---|---|---|
| 3,520,959 | 7/1970 | Busby | 317/262 E X |
| 3,655,307 | 4/1972 | Hawkins | 425/71 X |
| 3,686,374 | 8/1972 | Hawkins | 425/174.8 E X |
| 3,717,801 | 2/1973 | Silverberg | 317/262 E |

*Primary Examiner*—R. Spencer Annear
*Assistant Examiner*—Mark Rosenbaum
*Attorney, Agent, or Firm*—Thomas J. Morgan; Linn I. Grim; Marvin Bressler

[57] ABSTRACT

An apparatus and a process for holding a thermoplastic polymer film upon a moving surface by electrostatic means. A first, electrically charged, electrode, spaced in close proximity to the moving surface, which is grounded, provides an electrostatic charge pinning the film to the moving surface. A second non-corona producing electrode, maintained at an electrical potential equal or close to the electrical potential imposed upon the first electrode, and disposed further away from the moving surface than the first electrode, focuses the electrostatic charge holding the film to the moving surface.

10 Claims, 3 Drawing Figures

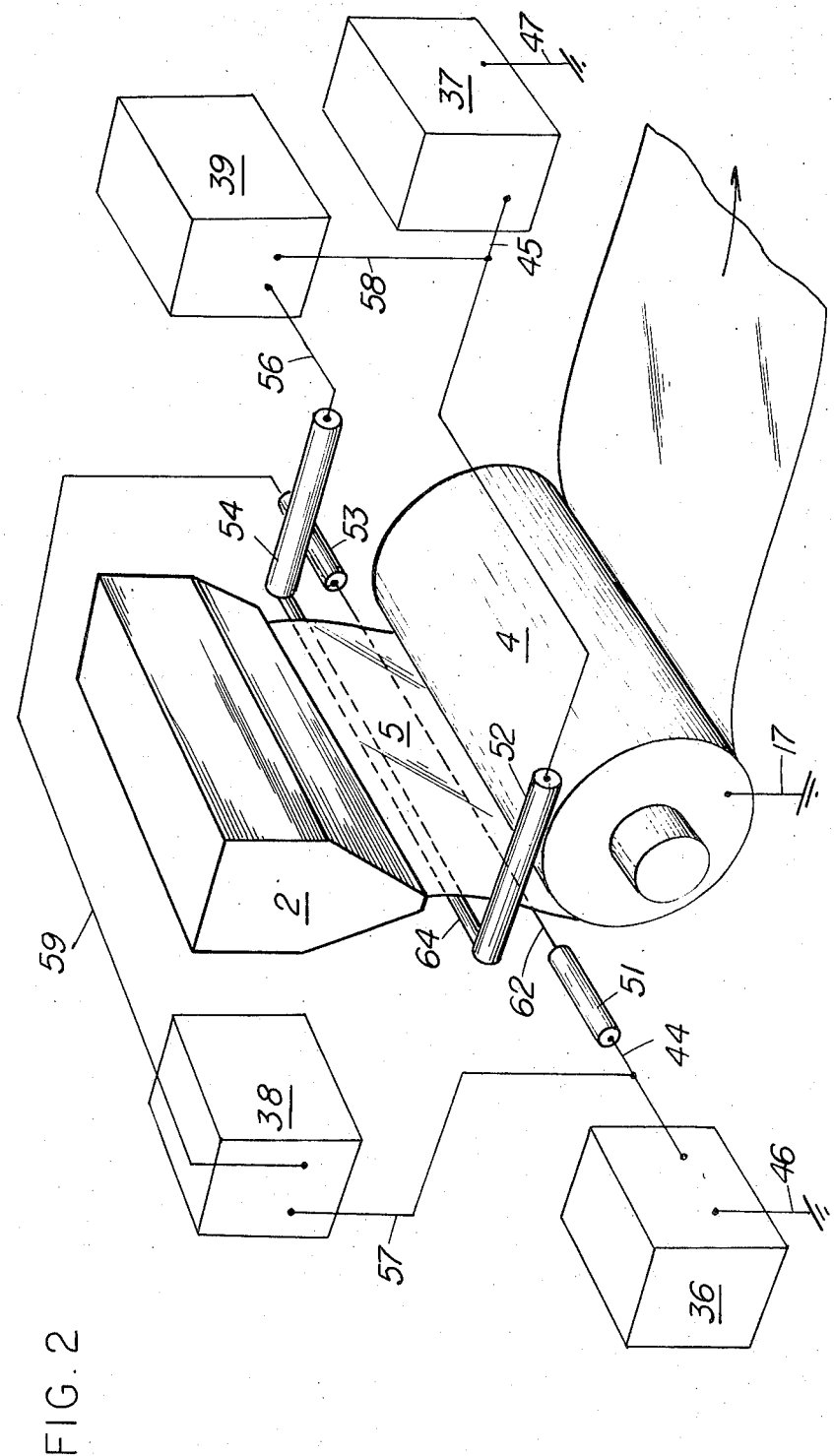

ELECTROSTATIC PINNING OF POLYMERIC FILM

BACKGROUND OF THE INVENTION

1. Field of the Invention

This invention is directed to a process and an apparatus for holding a thermoplastic polymeric film onto a moving surface by electrostatic means. More specifically, the instant invention is directed to a process and an apparatus for holding a thermoplastic polymeric film onto a moving surface by means of a first and a second electrode which are both electrically charged. Still more specifically, the instant invention is directed to a process and an apparatus for holding a thermoplastic polymeric film onto a moving surface by a first electrode which generates an electrostatic charge and a second electrode which focuses the charge to provide improved electrostatic pinning of the film onto the moving surface.

2. Description of the Prior Art

The method of "electrostatic pinning," that is, the holding of a thermoplastic polymeric film onto a moving surface, usually a casting drum, has generally been accepted as one of the most effective methods for maintaining good contact between a moving surface and a film. The success attending electrostatic pinning has encouraged many investigators to perfect the method in order to increase the speed at which films move over moving surfaces, particularly casting drums. As those skilled in the art are aware, the more rapid the contact of a film over a casting drum, without decreasing the cooling effect thereon, the greater is the film capacity.

An important corollary to the above aim of electrostatic pinning technology is to produce film which not only moves rapidly over moving surfaces with good contact, but to provide an apparatus and process in which the potential difference between the electrostatic producing electrode and the ground moving surface upon which the film is cast is minimized. As the prior art explains in great detail, film capacity, that is, the speed at which the film moves onto the moving surface, is dependent upon the potential difference between the electrode and the moving surface. However, improvement in film capacity by increased voltage on the electrostatic producing electrode is limited due to arcing which results when the potential difference exceeds a critical limit. Thus, an optimum electrostatic pinning system is one in which film capacity is optimized while potential difference between the electrostatic producing electrode and the grounded moving surface is minimized.

Among the most recent developments in electrostatic pinning technology has been the development of a two electrode system to increase film capacity. In this system, disclosed in U.S. Pat. No. 3,660,549 and 3,655,307, both issued to Hawkins, a first electrode is employed to provide an electrostatic charge to pin a film to a moving surface. A second electrode is employed to increase the pinning force on the film. To this end, the second electrode is grounded. In addition, presumably, in order to prevent arcing between the first and second electrodes, the second electrode is insulated. In order to increase the generation of pinning ions a further limitation imposed by Hawkins is that the second, grounded electrode be disposed such that the distance between the first and second electrodes is less than the distance between the first electrode and the grounded moving surface. This recent development in the electrostatic pinning art provides increased drum speed for the same potential difference between the first electrode and the moving drum.

The advance in the art provided by this innovation, still leaves much room for improvement. For instance, the focusing of the electrostatic force provided by the second grounded insulated electrode, is a sole function of the voltage imposed on the first electrode. That is, for a fixed potential difference between the moving surface and the first electrode the focusing effect of the second electrode is fixed and limited by the build-up of the charge around the second, grounded electrode.

A second problem associated with the two electrode system of the prior art resides in the possibility of arcing between the first and second electrodes due to the potential difference between the first charged electrode and the second grounded electrode. Indeed, in the two above recited patents it is required that the second electrode being protected by a high dielectric material. An important purpose of this coating is to decrease this arcing possibility.

A third limitation of the two electrode system of the prior art relates to the requirement imposed thereon, of increased electrical potential required to pin the film on the moving surface due to the necessity of the prior art system to dispose the first, corona producing electrode a significant distance from the grounded moving surface. This increases the danger of arcing. To overcome this danger, the prior art system preferably employs a gas having a higher breakdown voltage than air.

A still further disadvantage of this system of two electrodes suggested in the prior art is the requirement that the second electrode be closer to the first electrode than the first electrode is to the moving surface. Such a geometrical limitation increases the distance between the first electrode and the drum. As those skilled in the art are aware, the closer the first electrode is to the drum the greater the electrostatic pinning effect and thus the greater the capacity of the system for the same voltage driving force.

Yet another limitation of the two electrode electrostatic pinning of the prior art resides in the difficulty of removing coatings that deposit upon the second coated electrode. As those skilled in the art are aware, molten thermoplastic film being extruded through a die gives off vapors, such as decomposed polymer, low molecular weight polymer and unreacted reactant. These vapors condense on the coated wire which is maintained at a temperature below the condensation temperature of the vapors. The removal of this coating from the insulated second electrode is difficult.

SUMMARY OF THE INVENTION

The instant invention is directed to a process and an apparatus for pinning a thermoplastic polymeric film onto a moving surface by electrostatic forces. The invention entails the employment of a two electrode system which overcomes the deficiencies of the two electrode system of the prior art.

The two electrode, electrostatic pinning apparatus and process of the instant invention provides an improved focusing effect so as to strengthen the pinning propensity of the ions generated in the process and apparatus of the instant invention. This results in lowering the necessary voltage imposed on the electrostatic pinning first electrode for the same film throughput as compared to the systems of the prior art.

The two electrode apparatus and process of the instant invention, furthermore, provides improved reliability by substantially eliminating the possibility of arcing between the first and second electrodes. This assurance permits the apparatus and process of the instant invention to be operated without requiring the employment of a dielectric coating on the second electrode, which is used in the prior art to decrease the possibility of arcing.

Another improvement of the instant invention is decreased distance between the first, pinning electrode and the grounded moving surface. This permits lower potential differences therebetween. This, in turn, eliminates the necessity of additional means directed to decrease the possibility of arcing between the first electrode and the moving surface. Thus, means such as the employment of gases having dielectric constants greater than air, employed in the prior art are not required.

A still further feature of the process and apparatus of the instant invention is the ability to dispose the ion producing, first electrode — the electrode operated in the corona region — closer to the moving surface than the systems of the prior art. This permits the apparatus and process of the instant invention to operate at either increased speeds at the same electrical potential between the electrode and the moving surface or, alternatively, permitting electrostatic pinning to occur at a lower electrical potential for the same film throughput, compared to the two electrode systems of the prior art.

Yet another advantage of the apparatus and process of the instant invention over the electrostatic pinning apparatus and processes of the prior art is the ease with which both first and second electrodes may be kept free of foreign substances which deposit on their surfaces. In the prior art the employment of a dielectric coating on at least the second electrode makes removal of depositions which form thereon very difficult.

In accordance with the instant invention an apparatus is disclosed which provides all of the advantages over the prior art enumerated above. The apparatus of the instant invention, employed to hold a thermoplastic polymeric film onto a moving surface includes an electrically grounded moving surface over which the film moves. An electrically charged first electrode, spaced in close proximity to the moving surface, generates an electrostatic charge which holds the film to the moving surface. A second electrode, maintained at an electrical potential equal or close to that of the electrical potential imposed on the first electrode, is also provided. The second electrode is spaced at a distance further from the moving surface than the first electrode as measured along a plane normal to the plane of tangency defined by the moving surface and the film. The second electrode is further characterized by its inability to ionize the gas that surrounds it.

In further accordance with the instant invention, a process, distinguished over electrostatic pinning processes of the prior art, is also disclosed. In the disclosed process a thermoplastic polymeric film is held onto a moving surface by means of an electrostatic charge provided by a first electrode, spaced in close proximity to the moving surface, and connected to a source of high voltage electrical current. The electrostatic charge holding the film to the moving surface is focused and thus intensified by a second non-corona producing electrode, disposed in space relationship further from the moving surface than the first electrode, and maintained at an electrical potential equal or close to that of the first electrode.

BRIEF DESCRIPTION OF THE DRAWINGS

The instant invention may be better understood with reference to the accompanying drawings of which:

FIG. 2 is a schematic perspective view of another preferred embodiment of the instant invention;

DETAILED DESCRIPTION

Figure 1:
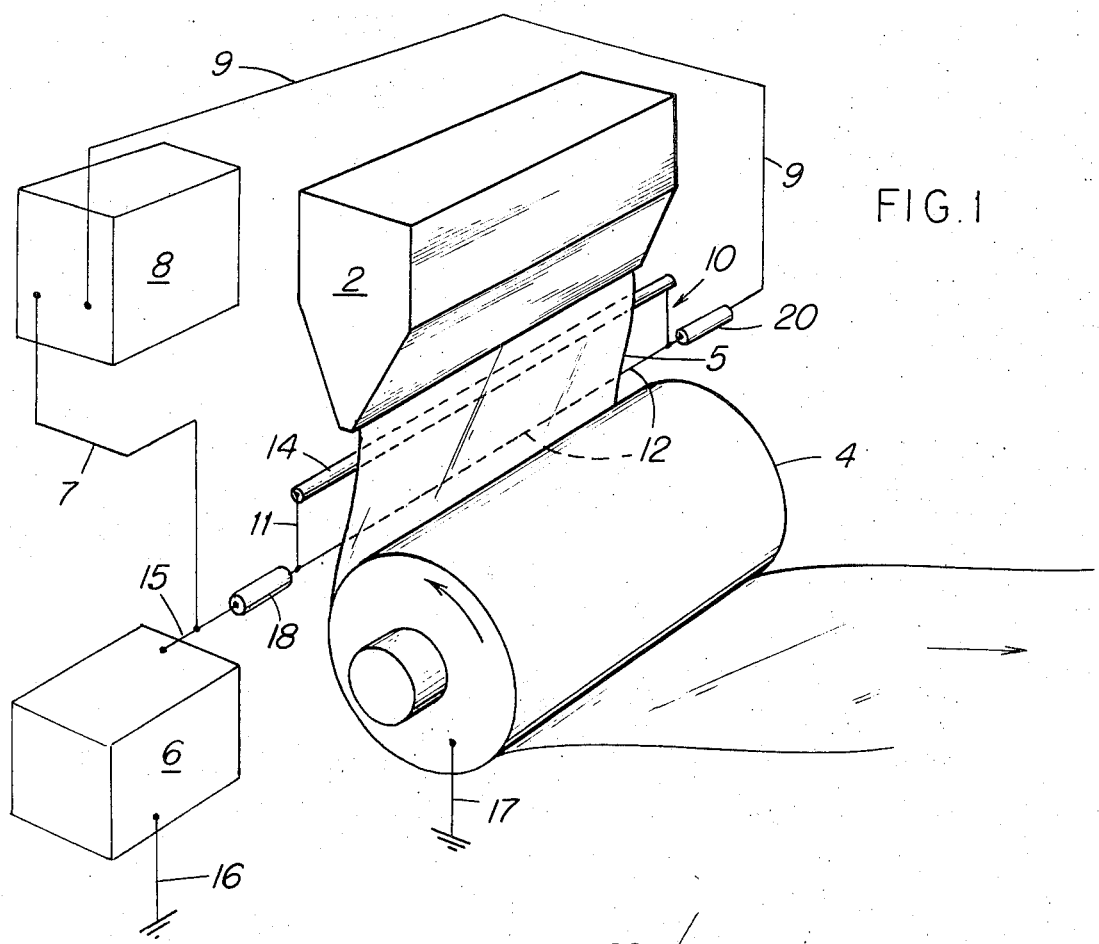
FIG. 1 is a schematic perspective view illustrating a preferred embodiment of the instant invention.

The detailed description of the instant invention may be best comprehended with reference to the drawings. Thus, turning to the drawings, it is often conventional in thermoplastic polymeric film forming operations to employ a hopper in communication with a die, depicted in the drawings at 2, for extruding a thermoplastic extrudate. Conventionally, the thermoplastic melt is placed in the hopper and extruded through the die which is in communication with the hopper. The extrudate, a semi-molten film 5 is conventionally chilled to form a totally solid film on a rotating chilled drum 4 which is grounded by grounding means 17. Among the thermoplastic polymeric films which are casted in accordance with the method described above are polyesters, especially polyethylene terephthalate, polyolefins, principally polyethylene and polypropylene, halogenated polyolefins, vinyl acetate polymers and copolymers, vinylidene chloride polymers and copolymers, polyamides, cellulosic esters and ethers, styrene polymers and copolymers, and polycarbonates. It should be appreciated that this grouping is not inclusive and other thermoplastic polymers and even certain thermosetting polymers are within the contemplation of the instant invention.

In order to improve the contact between the film 5 and the moving surface, in this case the rotating casting drum 4, a two electrode pinning device, generally indicated at 10, is provided. The two electrodes device 10 includes a first electrode 12 and a second electrode 14. The first electrode 12 is supplied with a source of high voltage direct current electricity from a high voltage direct current source 6. This supply is conveyed to the electrode 12 by means of conduit 15 which electrically connects the positive terminal of the source 6 to the electrode 12. Conventionally, the negative terminal of the high voltage direct current source 6 is grounded by means of electrical conduit 16. A pair of insulated electrode supports 18 and 20 are provided to maintain electrode in the desired position. In a preferred embodiment, illustrated in the drawings, an additional electrical source is provided. This source, illustrated at 8 in FIG. 1, is an alternating electrical current supply in communication, by means of electrical conduits 7 and 9, to the terminals of the first electrode conduit 12. The details of the construction of the alternating current source 8 are within the contemplation of the prior art. Details of a representative embodiment of the alternating current source 8 are provided by U.S. Pat. No.

3,520,959 issued to the co-inventor of the instant invention, which is incorporated by reference herein.

The first and second electrodes 12 and 14 are, in the preferred embodiment illustrated in FIG. 1, wire electrodes. Although the electrodes 12 and 14 are preferably stretched wires, they may also be single pointed wires, multiple pointed wire, a knife edge electrode or the like.

The second electrode 14, in the preferred embodiment illustrated in FIG. 1, is disposed adjacent to the first electrode 12. The one limitation imposed on the disposition of electrode 14, the second electrode, is that the distance between the first electrode 12 and the drum 4, as measured on a plane normal to the plane of tangency of the film 5 contacting the drum 4, is shorter than the distance measured along the same plane, between the second electrode and the casting drum 4.

A second limitation regarding the two electrode system of the instant invention relates to the effect the electrodes have on the surrounding gas. The first electrode 12 ionizes the surrounding gas to pin the film 5 onto the drum 4. On the other hand, the second electrode, in FIG. 1 the electrode illustrated at 14, does not ionize the surrounding gas. In other words, the second electrode is not in the corona region while the first electrode is. It should be emphasized that this characteristic is maintained even in the embodiment illustrated in FIG. 1 where both electrodes are maintained at the same electrical potential by means of electrical conduits 11 which connect the first and second electrodes 12 and 14 in parallel electrical configuration. As those skilled in the art are aware, this results in substantially the same electrical potential on each electrode. That two electrodes having the same electrical potential can exist with only one of the electrodes operating in an ionizing state can be explained by the generally accepted belief that the gas ionizing effect of an electrode is a function of the potential gradient at the surface of the electrodes. Thus, if a wire electrode is of greater diameter than a second wire electrode, the potential gradient of the larger diameter wire at its surface is lower than the potential gradient at the surface of the thinner diameter wire. In the embodiment illustrated in FIG. 1 the second electrode 14, a wire electrode, is of greater diameter than the wire electrode 12.

FIG. 2 represents another preferred embodiment of the instant invention. This embodiment differs from the embodiment illustrated in FIG. 1 in that separate electrical circuits are employed to energize the two electrodes. Again, the same hopper and the die, represented at 2, is employed. The film 5 is extruded through the die onto the drum 4, which, as in the case in FIG. 1, is grounded as illustrated at 17. A first, electrostatic pinning electrode 62 is provided, again preferably in the form of a stretched wire. The electrode 62 is supported by insulated supports 51 and 53 respectively. A high energy direct current source 36 whose positive terminal is in communication with the electrode 62 by means of electrical conduit 44 energizes the electrode 62. The negative terminal of the supply 36 is grounded as illustrated at 46. An alternate current source 38 is preferably provided to heat the electrode 62 so as to prevent depositions to form thereon. Again, as in the embodiment illustrated in FIG. 1, the terminals from the source 38 are connected to the terminals of the electrode 62 by means of electrical conduits 57 and 59.

A similar arrangement is provided for the second, focusing electrode 64. This electrode is in communication with a high energy direct current source 37 which supplies energy to the electrode 64 from its positive terminal by means of electrical conduit 45 connected to one terminal of the electrode 64. The electrode 64 is supported by insulated supports 52 and 54. In a preferred embodiment, the second electrode 64 is heated to prevent condensation of vapors thereon and keep the electrode clean. This is preferably provided by an alternating current source 39 connected to the terminals of the electrode 64 by means of electrical conduits 56 and 58. As in the case of the embodiment illustrated in FIG. 1, the details of construction of an AC heating means sources 38 and 39 are detailed in U.S. Pat. No. 3,520,959. It is reemphasized that the use of alternating current power sources to heat the electrodes are optional and other heating means known in the art may be substituted therefor.

Although in the preferred embodiment depicted in FIG. 2 the first and second electrodes are supplied by separate electrical sources they share the two limitations imposed upon the first and second electrodes in the embodiment illustrated in FIG. 1. That is, the first electrode 62 is closer to the moving surface 4 then the second electrode 64 as defined in the first preferred embodiment. In addition, the electrode 62 is in the corona region while the second electrode 64 is not. Again, in the embodiment illustrated in FIG. 2, it is preferable that the electrodes be stretched wires. In this case, the first electrode is 62 is of smaller diameter than the second electrode 64 in order to insure that the second electrode not ionize gas since the potential on each electrode, although usually somewhat different, is close enough to one another so that the diameter of the wire electrodes is critical in so far as ionization potential is concerned.

Figure 3:
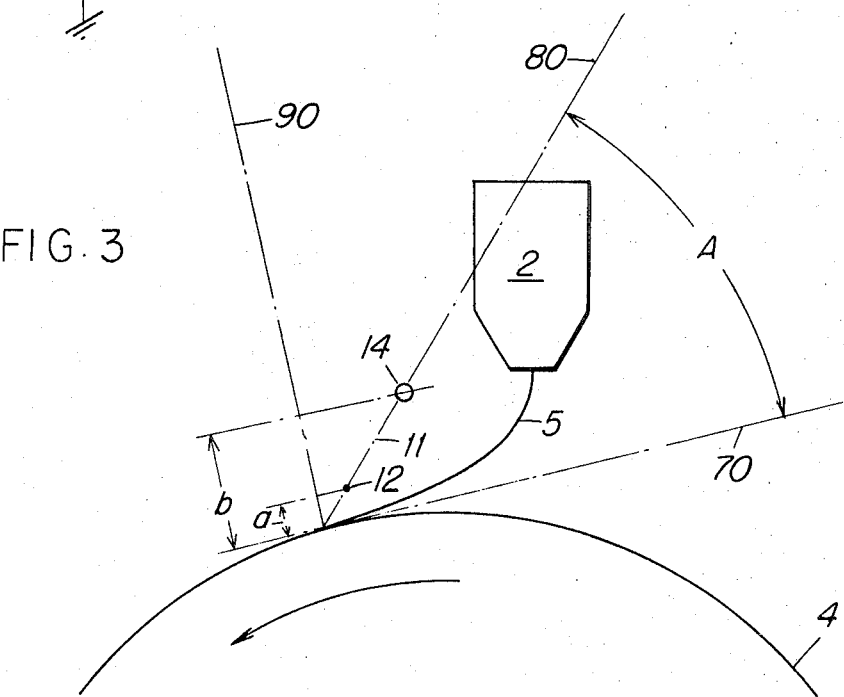
FIG. 3 is a schematic representation of a cross-sectional view of the instant invention.

The space relationship limitation of the first and second electrodes is best illustrated in FIG. 3. FIG. 3 illustrates a cross-section of the embodiment shown in perspective in FIG. 1. In this figure the plane 70 represents the plane of tangency between the film 5 and the moving surface 4. The plane normal to this plane is represented at 90. The limitation relating to the space relationship of the first electrode 12 and the second electrode 14 is schematically defined as follows: the distance denoted as $a$, the vertical distance on plane 90 of the first electrode 12 from the drum 4 is less than the vertical distance $b$, the projection of the distance between the second electrode 14 and the drum 4.

Turning now to the method of operation of the instant invention, reference is made to the embodiment illustrated in FIG. 1. As the film 5 is extruded through the die of the hopper - die arrangement 2 is contacts a moving surface, preferably a cooled casting drum 4, and is held thereon by the electrostatic pinning arrangement 10. The primary electrostatic pinning electrode, the first electrode 12, is maintained at a positive electrostatic charge in the range of between about 2 kilovolts to about 30 kilovolts. More preferably, the charge on the primary electrode 12 is maintained at an electrical potential in the range of between about 4 kv to about 10 kv. Still more preferably, the electrostatic pinning electrode 12 is maintained at an electrical potential in the range of between about 5 and 8 kv.

In the event that the electrode 12 is heated by means of an AC source, such as that illustrated at 8, the source is designed to output sufficient power so as to maintain the electrode at a temperature above about 250° C. and more preferably from about 275° C. to about 350° C.

Of course, in the embodiment illustrated in FIG. 1 the charge and temperature imposed on the second electrode 14 is substantially the same as that imposed on the first electrode 12 because of their parallel electrical configuration. It should be appreciated that it is a feature of the instant invention that the charge on the second electrode be the same or close to that of the first electrode. Although not essential, it is preferable also that both electrodes be heated to approximately the same temperature. The electrostatic pinning force imposed upon the film 5 as it contacts the casting drum 4 is substantially equal to the charge emitted from the surface of the first electrode 12. This is so since the casting drum 4 is grounded. The force holding the film 5 to the drum 4 is postulated to be caused by the electrostatic pinning effect of the first electrode 12 which ionizes the gas which surrounds it. The ionized gas comprises positively charged ions and negatively charged electrons. It is theorized that the positively charged ions exert an electrostatic force on the film 5. It is for this reason that the moving surface here the drum 4, is grounded. This insures, in accordance with the theory postulated above, that there is no positive charge on the drum to repel the positively charged ions forcing the film down upon the drum. This is quantitatively defined by the voltage difference between the first electrode and the drum. Obviously, when the charge on the drum is zero (when grounded) this force is maximized.

What is also accepted in accordance with electrostatic theory is that the positively charged ions are free to migrate away from the drum to other places to which they are attracted. Primarily, in the prior art the hopper and die, here denoted at 2, which is usually of metallic construction, attracted many of the positively charged ions. This not only introduces the danger of arcing between the primary electrode and the die, but equally importantly, decreases the electrostatic force exerted on the film due to the decreased number of positively charged ions to exert this force. In accordance with the theory of the instant invention, it is postulated that the second electrode provides a focusing effect. That is, the second electrode is strongly positively charged. Thus, positively charged ions, formed by the ionizing effect of the first electrode are repelled away from the electrode 14 since they are like charged. Since the second electrode is disposed further away from the drum than the first electrode the effect of this positively charged second electrode is to concentrate the ions formed by the first electrode in the direction of the drum.

In accordance with the theory of the instant invention it is further postulated that since the second electrode is positively charged, it attracts the negatively charged electrons formed during ionization. It is generally believed that the negatively charged electrons, in the past, recombined with the positively charged ions to neutralize each other. The result of this recombination is to decrease the pinning effect of the positively charged ions to hold the film onto the grounded drum. In the instant invention it is theorized that the negatively charged ions are attracted toward the positively charged second electrode so that they do not interfere with the positively charged ions migrating toward the film.

In accordance with the theory postulated for the instant invention, the two electrode system of the instant invention is far superior to the two electrode system of electrode electrostatic system of the prior art. In the prior art system the second electrode is grounded and no charge is thereupon imposed. Thus, positively charged ions formed by the first electrode are free to surround the second electrode and thus, it is postulated, provides a mildly positive charge upon the dielectric insulation of the second electrode. However, the charge formed on the second electrode is small compared to the high positive charge imposed upon the second electrode of the instant invention. As a result the effect of the second electrode in the prior art is far smaller than that of the instant invention. Thus, the repelling effect of the second electrode on the positive ions and the attracting effect of the electrons which are both formed under the ionizing action of the first electrode is much smaller than in the instant invention.

The above theory explaining the operation of the instant invention is based on the fact that the second electrode does not ionize the gas around it. Rather, the second electrode is maintained as a positively charged source. This is accomplished in the instant invention as explained previously, although the charge on the second electrode is equal to that of the first electrode. It is well established theory of electrostatics that the ionizing effect is a function of the electrostatic force in the vicinity of the gas that may be ionized. Moreover, the ionization potential of a source is maximized at its center. Thus, the potential at any distance away from the center decreases exponentially. Therefore, two arcuate sources upon which the same potential is imposed may product different ionizing effects. The difference between the effects is a function of the distance from the center of the arcuate source and the surface of said source. In other words, a thicker diameter wire provides a lower potential gradient at its surface than a thinner wire, although both wires are in communication with same electromotive force. Thus, in the instant invention the second non-ionizing electrode is of greater diameter than the first, ionizing electrode.

It should be understood that the above-described theory of the operation of the instant invention is generally accepted. However, other may postulate other theories for the instant invention which may, in time, be more generally accepted as the rationale for the success of the instant invention. It should be appreciated, however, that the instant invention provides unexpectedly better results than the prior art electrostatic pinning devices. It is these improved results that distinguish the instant invention from those of the prior art.

The embodiment illustrated in FIG. 1 provides simplicity in that the system requires only a single high voltage source. It, moreover, is effective in that imposes a significantly high positive charge on the second electrode so that it provides excellent focusing of the positive ions against the drum. However, in certain applications it may be necessary for the charge on the second electrode to be either less than or greater than the charge imposed upon the first electrode. In that case a system as described above and illustrated in FIG. 2 is employed. Since the electrical sources to each electrode are independent, the electrical potential imposed upon the electrodes 62 and 64 are independent. This embodiment provides greater flexibility at the price of additional equipment costs. It should be appreciated however, that both embodiments are clearly within the contemplation of the instant invention.

The following examples illustrate the instant invention. Since these examples are meant for illustrative purposes only, they should not be interpreted in any way as limiting the invention to the specific examples given below.

EXAMPLE I

A melt of polyethylene terephthalate is fed into a hopper and extruded through a die attached thereto, as illustrated in FIG. 1 at 2. The extrudate emitting through the die in the form of a sheet of incompletely solidified film 5 is cooled on the casting drum 4. The drum 4, as illustrated in FIG. 1, is grounded. During this test an arrangement similar to that illustrated in FIG. 1 was employed. That is, the first and second wire were both supplied by a single electrical source. The disposition of the wires was as illustrated in FIG. 3. In this example, stretched wires were employed as the electrodes. The first electrode denoted in FIG. 1 at 12, had a diameter of 0.008 inch. The second electrode was also a stretched wire, having a diameter of 0.015 inch. The first stretched wire electrode 12 was disposed a distance of about ⅛ inch from the surface of the drum 4 at the point of tangency. That is, the distance along the plane 80 in FIG. 3 was about ⅛ inch. The distance between the first electrode 12 and the second electrode 14 was approximately ⅜ inch, again as measured along the plane denoted by 80 in FIG. 3. The plane 80 formed an angle, with the plane of tangency 70, denoted in FIG. 3 as A, of 45°.

The polyethylene terephthalate melt was fed into the hopper at a rate sufficient to form a biaxially oriented film having a thickness of 0.5 mil. The casting drum was initially rotated at a speed sufficient to impart a linear film velocity of 115 ft. per minute. The speed of the film web was increased in increments of 5 ft. per minute while maintaining the melt feed at a rate sufficient to form the 0.5 mil biaxially oriented film. Cast sheet samples (6.8 mils thick) were taken at each incremental speed to determine pinning quality. Pinning quality was determined by examining the samples pinning defects, such as pin holes, or strain patterns resulting from poor pinning, under cross-polarized light. No defects were found for all samples run at up to 145 ft. per minute. The speed of the casting drum was increased to impart a linear velocity of 150 ft. per minute to the film. Additional samples of the cast sheet were checked. None of the samples had any defects when examined under cross-polarized light. Additional samples were taken after the apparatus was run for 45 minutes at 150 ft. per second. There were no defects in the samples tested after 45 minutes also. The film speed was then increased to 155 ft. per minute, which was the maximum speed run in this test. At the maximum speed of 155.1 ft. per minute 1,514 pounds per hour of polyethylene terephthalate melt was being fed into the hopper. The voltage on the first and second electrodes was 5.3 kv while the pinning current was maintained at 1.7 milliamperes.

These results compare quite favorably with the two electrode systems of the prior art. For example, U.S. Pat. No. 3,655,307 and 3,660,549 indicate a maximum drum speed of 150 ft. per minute in Examples 9 and 11, respectively, but require a voltage of 10.1 kv. This is almost double the voltage necessary in the instant invention.

EXAMPLE II

The test of Example I was repeated under the same conditions as that enumerated in Example I except that the apparatus was set up in accordance with the embodiment illustrated in FIG. 2. Thus, Example II was run with the first and second electrodes, 62 and 64, powered by separate electrical sources, shown in FIG. 2 at 36 and 37 respectively. The first and second electrodes were again, stretched wires having the same respective diameters as in Example I. Also the stretched wire electrodes were spaced and disposed as in Example I.

In this example, polyethylene terephthalate melt was fed into the hopper at a rate sufficient to provide a biaxially oriented film of 0.5 mil thickness. The test was again initiated at a drum speed of 115 ft. per minute and was increased at increments of 5 ft. per minute. At each increment samples were taken and analyzed as in Example I. The test was continued to slightly above 150 ft. per minute with all samples indicating no pinning defects. At all drum speeds up to 150 ft. per minute both electrodes were maintained at 6.0 kv. At a drum speed of 150 ft. per minute the voltage on the secondary wire, which was separately powered in this example, was increased to 6.6 kv while the first electrode was maintained at 6.0 kv. Visually, a slight improvement in pinning could be observed. The test was terminated at this differential voltage after the drum speed reached 155 ft. per minute.

EXAMPLE III

Example I was repeated employing a different power supply unit which fed electrical potential to both first and second electrodes. In this test both electrodes were heated to a temperature in excess of 250° C. by an alternate current supply. The primary purpose of this test was to produce biaxially oriented 0.5 mil polyethylene terephthalate film. In accordance with this objective, the test was run at a series of increasing speeds. The maximum speed employed was 144 ft. per minute at the casting drum. The film was drawn off the casting drum and was stretched in the machine direction at a draw ratio of 3.60. Thereafter, the forward drawn film was drawn in the longitudinal direction at a draw ratio of 3.8. The film moved off the longitudinal drawing apparatus at a speed of 531 ft. per minute. This procedure was continued for 10 minutes and a 50 foot sample of the biaxially oriented film was tested. The film was acceptable and evidenced no defects resulting from electrostatic pinning.

The description of the preferred embodiments and the examples given above are meant to be illustrative of the scope and spirit of the instant invention. These preferred embodiments and examples will make apparent other embodiments and examples within the scope and spirit of the invention described herein. These preferred embodiments and examples, within the scope and spirit of the instant invention, are contemplated by this invention. Therefore, the invention should be limited only by the appended claims.

What is claimed is:

1. An apparatus for holding a thermoplastic polymeric film onto a moving surface comprising:

an electrically grounded moving surface upon which said film moves;

an electrically charged first electrode, spaced in close proximity to said moving surface, having the capacity to ionize gas which surrounds it; and a second electrode maintained at an electrical potential equal or close to that imposed on said first electrode, said second electrode spaced at a distance further from the moving surface than said first electrode as measured along a plane normal to the plane of tangency defined by said moving surface and said film and has a structure which produces a potential gradient insufficient to ionize said gas.

2. An apparatus in accordance with claim 1 wherein said first and second electrodes are provided with heating means by maintaining said first and said second electrodes at a temperature in excess of 250° C.

3. An apparatus in accordance with claim 2 wherein said heating means are an alternating current electrical power source.

4. An apparatus in accordance with claim 1 wherein said first and second electrodes are electrically charged by high power direct current means.

5. An apparatus in accordance with claim 4 wherein said first and said second electrodes are electrically charged by the same high power direct current source, said source in electrical communication to said first and said second electrodes which are disposed in parallel electrical configuration with one another.

6. An apparatus in accordance with claim 4 wherein said first and said second electrodes are electrically charged by separate high power direct current sources, said first and said second electrodes in electrical communication with said direct current sources by means of separate electrical communications between said electrodes and the positive terminal of said separate direct current sources.

7. An apparatus in accordance with claim 1 wherein said first and second electrodes are stretched wires.

8. An apparatus in accordance with claim 7 wherein said first wire electrode is of smaller diameter than said second wire electrode.

9. An apparatus in accordance with claim 1 wherein said moving surface comprises a casting drum upon which said polymeric film moves after being extruded through a die.

10. An apparatus in accordance with claim 1 wherein said thermoplastic polymer is polyethylene terephthalate.

* * * * *